US007864230B2

(12) United States Patent
Sugita

(10) Patent No.: US 7,864,230 B2
(45) Date of Patent: Jan. 4, 2011

(54) INSPECTION APPARATUS

(75) Inventor: Norio Sugita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 11/830,623

(22) Filed: Jul. 30, 2007

(65) Prior Publication Data

US 2008/0122955 A1 May 29, 2008

(30) Foreign Application Priority Data

Aug. 4, 2006 (JP) ............................. 2006-213469

(51) Int. Cl.
*H04N 9/64* (2006.01)
(52) U.S. Cl. ...................................... 348/247; 348/246
(58) Field of Classification Search ................. 348/241, 348/246, 247, 125–134; 359/368–398
See application file for complete search history.

(56) References Cited

U.S. PATENT DOCUMENTS

| 6,035,072 | A | * | 3/2000 | Read | 382/275 |
| 6,381,357 | B1 | * | 4/2002 | Tan et al. | 382/141 |
| 6,661,456 | B1 | * | 12/2003 | Aufrichtig et al. | 348/247 |
| 6,980,677 | B2 | * | 12/2005 | Niles et al. | 382/128 |
| 2001/0008418 | A1 | * | 7/2001 | Yamanaka et al. | 348/222 |
| 2002/0062202 | A1 | * | 5/2002 | Arai | 702/127 |
| 2003/0174902 | A1 | * | 9/2003 | Barkan | 382/274 |
| 2004/0174320 | A1 | * | 9/2004 | Matthijs et al. | 345/30 |
| 2005/0196778 | A1 | | 9/2005 | Yamamoto et al. | 435/6 |
| 2006/0275893 | A1 | * | 12/2006 | Ishii et al. | 435/288.7 |

FOREIGN PATENT DOCUMENTS

JP  2005-181145  7/2005

* cited by examiner

*Primary Examiner*—Lin Ye
*Assistant Examiner*—Mark Monk
(74) *Attorney, Agent, or Firm*—Fitzpatrick, Cella, Harper & Scinto

(57) ABSTRACT

An inspection apparatus for inspecting a microarray comprises an image sensor for imaging the microarray, a moving means for moving the image sensor relative to the microarray, a memory for memorizing the position of a defective picture element on the image sensor, and a controlling means which determines an overlap state of an imaging area of the defective picture element on reaction areas on the microarray and controls the moving means based on the result of the determination.

6 Claims, 10 Drawing Sheets

INSPECTION APPARATUS

BACKGROUND OF THE INVENTION

1. Field of the Invention

The present invention relates to an inspection apparatus for inspecting a microarray, particularly to an inspection apparatus for examining a DNA microarray with an area sensor like CCD.

2. Description of the Related Art

The area sensor employed conventionally with such an inspection apparatus includes CCD sensors, and CMOS sensors. Such a sensor reads signal charges stored in photodiodes, photoelectric conversion elements for picture elements, as image information. Japanese Patent Application Laid-Open No. 2005-181145 discloses a nucleic acid analysis apparatus which reads fluorescence of a DNA microarray with a CCD sensor. This apparatus excites probes in a DNA microarray by irradiation with a light-emitting diode and detects the fluorescence of the respective probes with a CCD sensor. This apparatus is capable of measuring simultaneously the fluorescence intensities of the respective probes of a DNA microarray under nearly uniform measurement conditions at a higher precision. Moreover, the reading unit of the apparatus occupies a smaller space, being less expensive, causing less failure, and being nearly maintenance-free.

The area sensor like the CCD can contain some defective picture elements owing to a defect of the photodiode. The defective picture element will disturb normal reading of the signal charge information. In the case where a fluorescence image formed by hybridization of probes of a DNA microarray is picked up, the defective picture element overlapping the spot image of the probe disturbs the normal detection of the fluorescence intensity.

SUMMARY OF THE INVENTION

The present invention intends to solve the above problems and to provide an inspection apparatus affected little by a defective picture element of the area sensor.

The present invention is directed to an inspection apparatus for inspecting a microarray comprising an image sensor for imaging the microarray, a moving means for moving the image sensor relative to the microarray, a memory for memorizing the position of a defective picture element on the image sensor, and a controlling means which determines an overlap state of an imaging area of the defective picture element on reaction areas on the microarray and controls the moving means based on the result of the determination.

The controlling means can calculate a score for determining the overlap state by shifting the position of the defective picture element relative to the reaction area, and adjusts the relative position of the microarray to the image sensor. The memory can memorize information on a center position coordinate and a spot diameter of a spot area on the microarray.

The microarray can be a DNA microarray.

The image sensor can be an area sensor. The information on the position of the defective picture element of the area sensor can be renewed.

The present invention enables canceling the adverse effect of a defective picture element of the sensor in pick-up of the image of a reaction product in a microarray. Thereby an excellent image can be picked up for precise examination of the reaction result.

Further features of the present invention will become apparent from the following description of exemplary embodiments with reference to the attached drawings.

DESCRIPTION OF THE EMBODIMENTS

Figure 1:
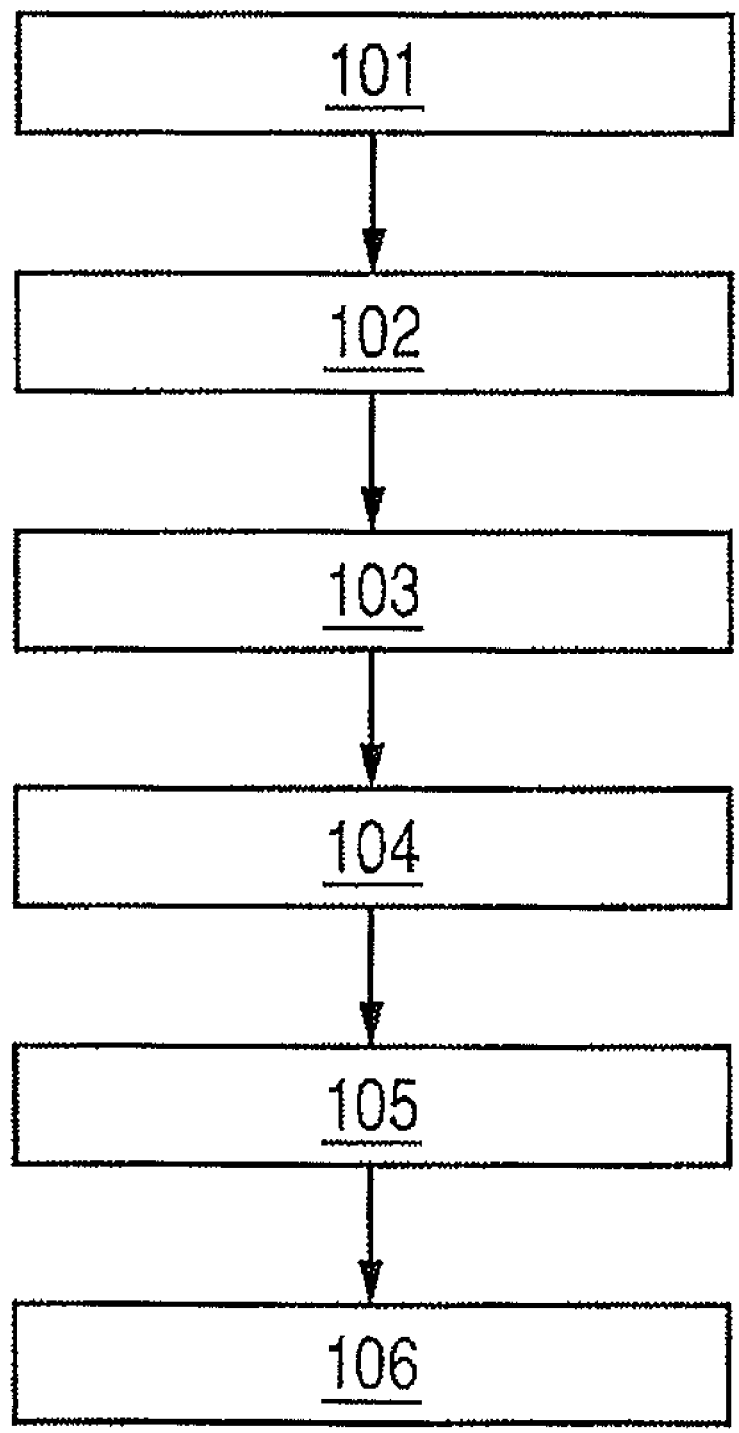
FIG. 1 is a flow chart illustrating a flow of a signal detection process in the present invention.

FIG. 1 is a flow chart of a signal detection process in the present invention in which the output signals of the image sensor are affected little by a defective picture element of the sensor.

Firstly, information on a defective picture element in the image sensor is derived (Step 101). In this step, a black image is taken with the sensor having many picture elements in the dark, and a white image is taken with illuminating the sensor with sufficiently intense light to saturate the output of all of the picture elements. The black image and the white image are compared. The picture element outputting a signal other than black and white is detected as a defective picture element. The information obtained in Step 101 on the defective picture element is input to a memory (Step 102). The treatments of Step 101 and Step 102 may be conducted timely to renew the information on the defective picture element. Then information on the spot of the DNA microarray is picked up. That is, the image of the microarray is picked up (Step 103). The information on the spot includes the spot center coordinates, the spot diameter, and the importance level of the probe of the spot. In the next step, the information on the defective picture element and the information on the spot taken in Steps 102 and 103 are compared, and the score is calculated as the representative value for the influence of the defective picture element (Step 104). The representative value can be obtained, for example, by taking an image over the entire imaging area of the sensor, specifying the position of defective picture element, deriving the representative value according to a predetermined calculation method. Then the position of the defective picture element is shifted, and another representative value is derived in the same calculation method as above. This calculation is repeated. The representative values enable determination of overlap of the reaction area and the defective picture element position on the microarray. Naturally the position of the defective picture element is shifted within the imaging area of the microarray for obtaining the necessary information. From the above result, the image-taking position is selected to minimize the score (Step 105). When plural positions for the minimum of the score of taking the image are found, the position is selected to be closest to the center of the detection area of the sensor, and the image of the microarray is taken at the selected imaging position (Step 106). The procedure of the signal detection will be described later in detail.

Figure 2:
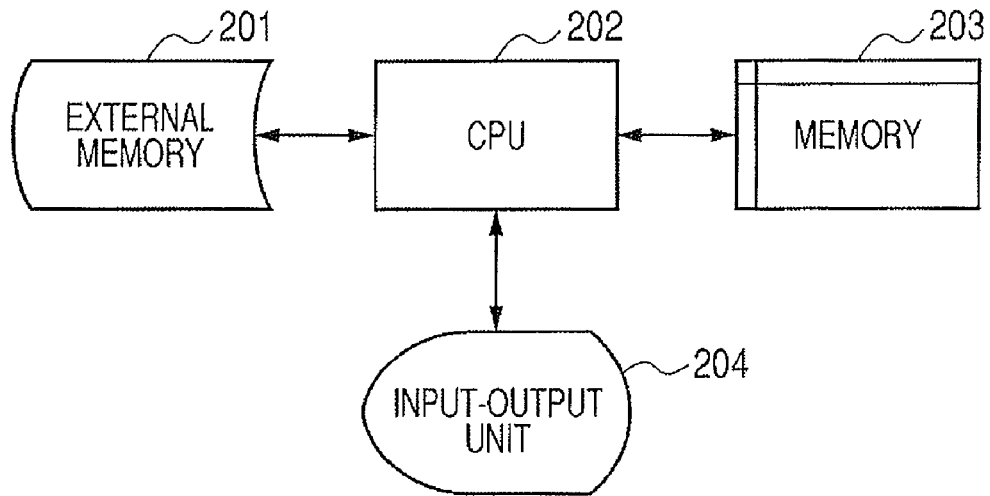
FIG. 2 is a block diagram illustrating a constitution of an information processing assembly contained in the inspection apparatus of the present invention.

FIG. 2 is a block diagram illustrating a constitution of an information-processing assembly contained in the inspection apparatus of the present invention. The process of signal detection is installed in an apparatus having external memory 201, central processing unit (CPU) 202, memory 203, and input-output unit 204. External memory 201 stores the program for the signal detection employed in the present invention, and image information such as the level of the luminance resulting from a hybridization reaction. Central processing unit (CPU) 202 conducts the program and controls the entire apparatus. Memory 203 memorizes temporarily a program and subroutine employed by central processing unit (CPU) 202, information on the defective picture element, data of image pick-up, and so forth. Input-output unit 204 interacts with the user. For example, the trigger for starting a program for determining the organism species is input by the user through this input-output unit. The confirmation of the results by the user, and control of program parameter are conducted through this input-output unit.

Figure 3:
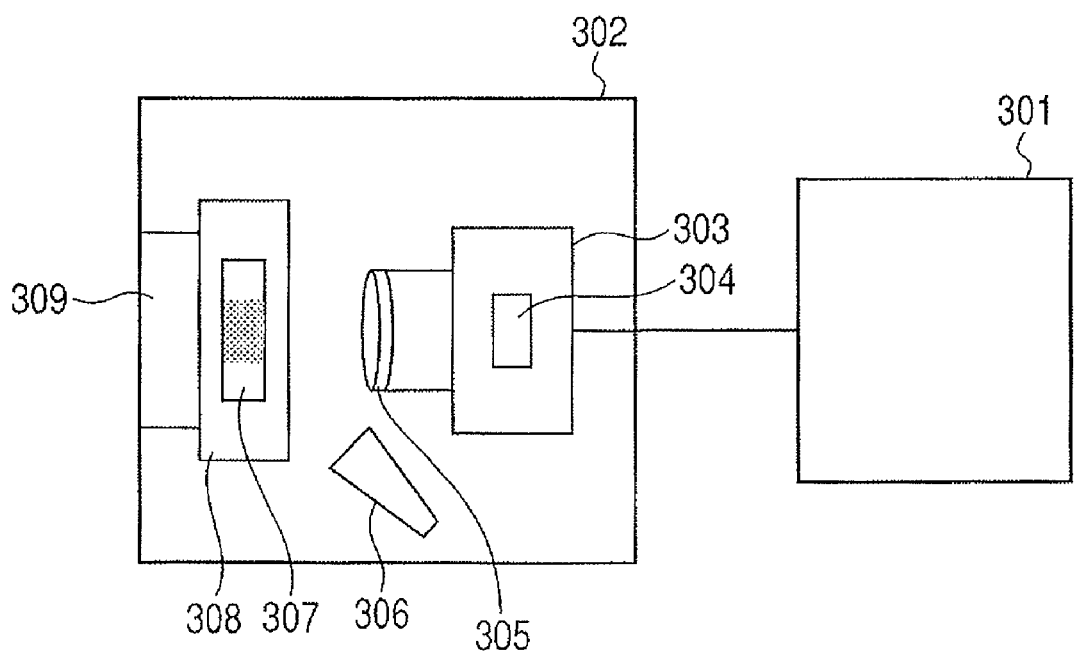
FIG. 3 illustrates an entire constitution of an inspection apparatus of the present invention.

FIG. 3 illustrates an entire constitution of an inspection apparatus of the present invention. This inspection apparatus comprises information-processing assembly 301 illustrated in FIG. 2; and a dark box 302 containing imaging unit 303 having built-in CMOS image sensor 304 as the area sensor having many picture elements arranged two-dimensionally and fluorescence filter 305 attached thereto, exciting light source 306 for generating light to be projected to the DNA microarray, and DNA microarray-supporting base plate 308 for fixing DNA microarray 307 to an imaging position. Microarray 307 after the hybridization reaction is excited by a light beam from exciting light source 306 and the emitted fluorescence pattern is picked up through fluorescence filter 305 by imaging unit 303. Imaging unit 303 is controlled by the input-output unit of information-processing assembly 301 through a communication cable like a USB cable connected thereto. DNA microarray-supporting base plate 308 is moved vertically or laterally on a two-dimensional plane by movement mechanism 309. The DNA microarray is moved to pick up the image at a position of the microarray where the score becomes minimum as shown in Step 105 in FIG. 1. The movement mechanism 309 is controlled by information processing assembly 301.

Figure 4:
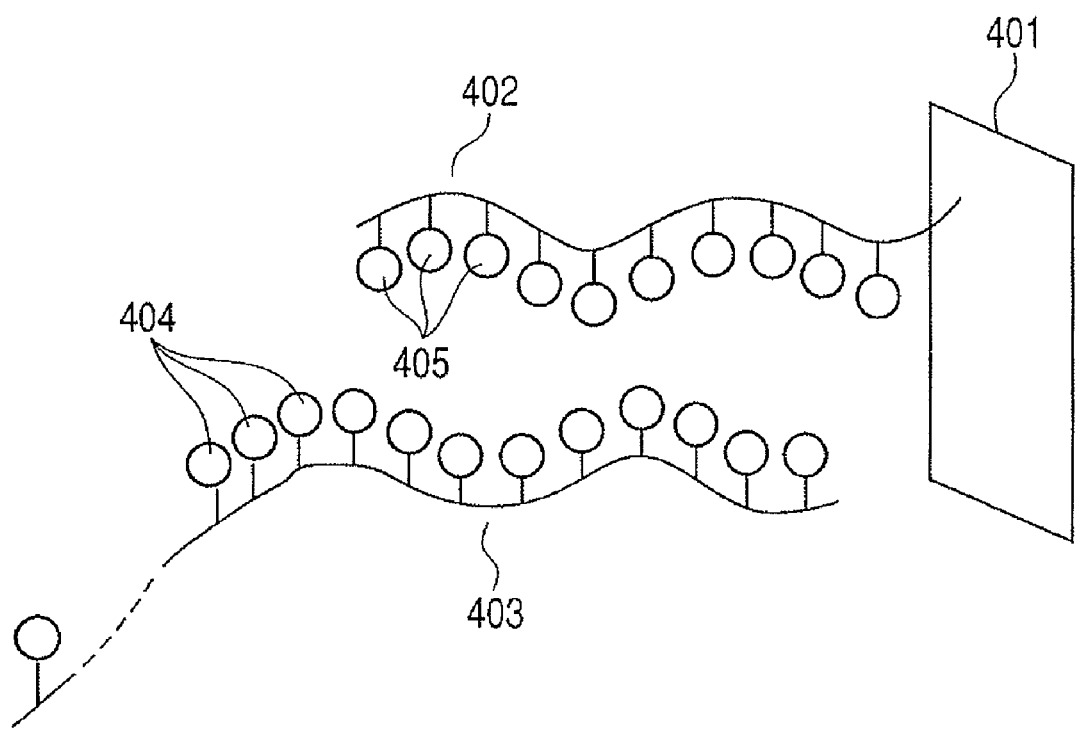
FIG. 4 illustrates a state of hybridization on a DNA microarray.

FIG. 4 illustrates hybridization on a DNA microarray. In biological objects, DNA has mostly a double helix structure. The two strands constituting the double helix are bonded by hydrogen bonding between the bases. On the other hand, RNA is mostly in a single strand state. The bases in the DNA include four bases of A, T, G and C, and the bases in the RNA include four bases of A, U, G and C. The hydrogen bonding is formed between A and T(U), and between G and C. Generally the hybridization reaction is formation of bonding between single-stranded nucleic acid molecules through partial base sequences. In the hybridization reaction assumed in the present invention, the nucleic acid molecules (probe) immobilized on base plate 401 in FIG. 4 are shorter than nucleic acid molecule 404 in the sample. When a sequence of bases 404 of nucleic acid molecule 403 in the sample contains a sequence complementary to the sequence of bases 405 of probe 402, this hybridization reaction occurs to allow trapping of target nucleic acid molecules in the sample by the DNA microarray.

Figure 5:
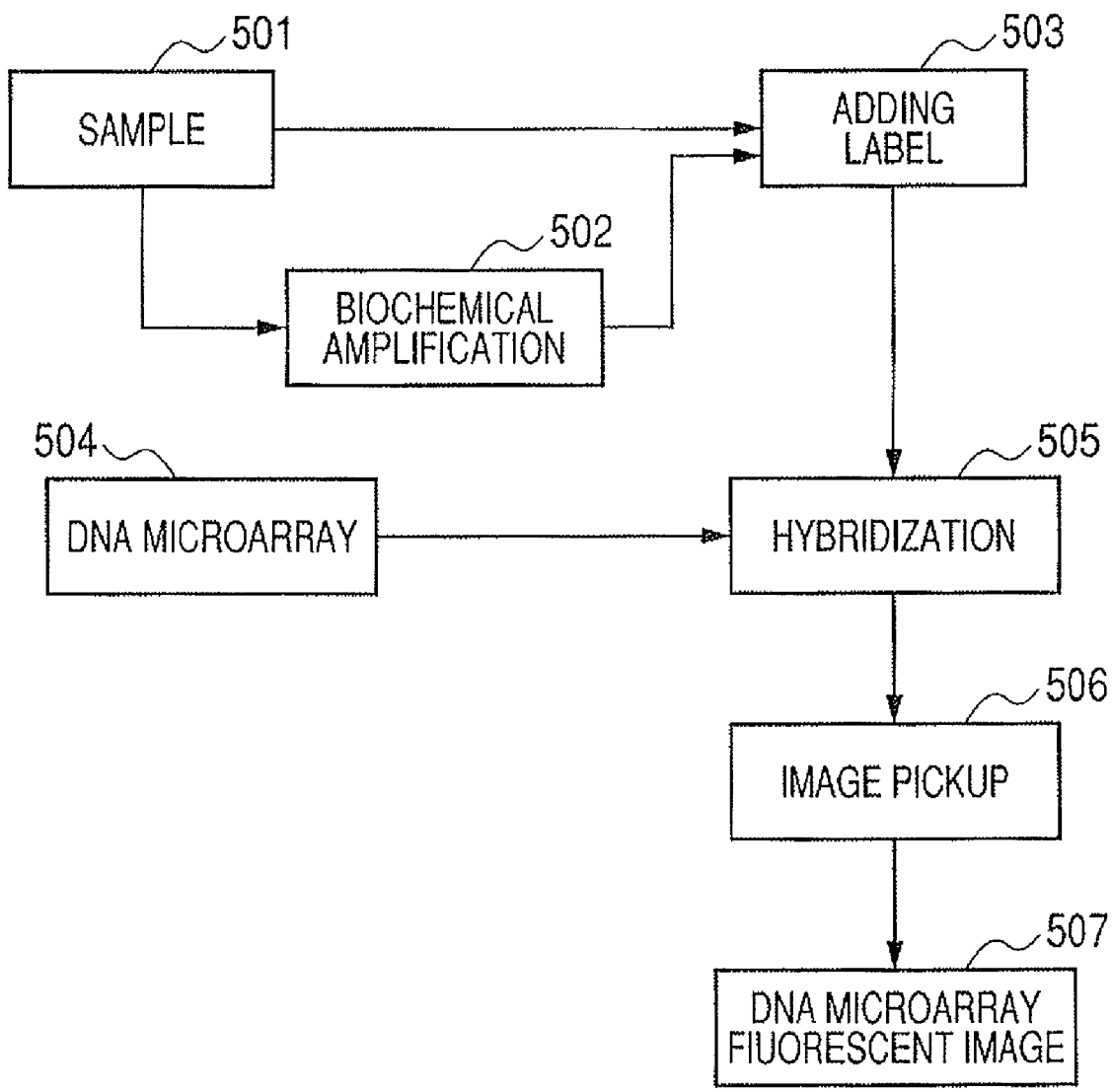
FIG. 5 illustrates a procedure of operations of experiment of hybridization reaction with a DNA microarray.

The procedure of operations with the DNA microarray is described below with reference to FIG. 5. In Step 501, the specimen is prepared. The "sample" as the specimen includes liquids and solids which are expected to contain an objected nucleic acid. For example, in the case where the inspection apparatus of the present invention is employed for identifying the bacteria causing an infectious disease, the sample includes many kinds of things which may contain the bacteria, such as bodily fluids of humans, farm animals and the like animals such as blood, sputumsuch, gastric liquid, vaginal secretion, intraoral mucus; excretion such as urine and feces. The sample includes also foodstuffs which can cause food poisoning, environmental water such as drinking water and hot spring water, and mediums which can cause bacterial pollution. The sample further includes animals and plants which are objects of medical inspection in export or import.

In the next Step 502, the sample is prepared by "biochemical amplification". For example, in identification of a bacterium causing an infectious disease, an objective nucleic acid is prepared by PCR by employing a primer for the PCR specially designed for detection of 16s rRNA, or the PCR amplification product is further amplified by PCR or a like method. The sample may be prepared by a method other than the PCR such as a LAMP process. The sample preparation herein signifies adjustment of the sample to meet a prescribed standard including the concentration, amount, chain length and the like of the objective nucleic acid.

In Step 503 for labeling, the sample amplified in Step 502, or the sample prepared in Step 501 but not amplified is labeled for visualization by a suitable labeling method. The labeling substance includes fluorescent substance such as Cy3, Cy5, and Rodamin. The labeling molecule may be added during the biochemical amplification in Step 502.

In Step 505, the nucleic acid labeled with the labeling molecule is subjected to hybridization reaction with the microarray having been prepared in Step 504, in a manner as illustrated in FIG. 3. For example, for identification of a bacterium causing an infectious disease, a base sequence specific to the causative bacteria is immobilized on the DNA microarray prepared in Step 504 on the base plate. The probe for the objective bacterium is designed from a portion of a genome coding 16s rRNA to have a probe base sequence highly specific to the bacterium to have hybridization sensitivity as uniform as possible. The support (base plate) of the microarray for immobilizing the DNA microarray probes includes flat base plates such as glass base plates, plastic base plates, and silicon wafers; and non-flat three-dimensional structures such as spherical matters like beads, bars, cords, and threads.

The surface of the base plate may be treated, if necessary, for immobilization of the probe DNA. In particular, introduction of a functional group for causing a chemical reaction on the surface is preferred for reproducibility owing to stable bonding of the probe in the process of hybridization reaction. The immobilization in the present invention includes combination of a maleimide group with a thiol group (—SH). Specifically, the surface of the base plate is treated to have a maleimide group for immobilizing the nucleic acid probe by reaction of the thiol of the nucleic acid fed to the solid surface with the maleimide group on the base plate surface. The maleimide group can be introduced by reaction of an aminosilane coupling agent with the glass base plate surface, and a subsequent reaction of the amino group of the coupling agent with an EMCS reagent (N-(6-maleimidocaproyloxy) succinimide: supplied by Dojin Co.). The SH group can be introduced to the DNA with 5'-Thiol-Modifier C6 (supplied by Glen Research Co.) by means of an automatic DNA synthesis apparatus. The combination of the functional groups for the immobilization other than the thiol-maleimide includes combination of an epoxy group (on the solid phase) with an amino group (on the terminal of the nucleic acid probe). A surface treatment with a silane coupling agent is also effective: the functional group introduced by the silane coupling agent is allowed to react with an oligonucleotide having a reactive functional group. Coating with a resin having a functional group is also useful.

After the hybridization reaction, the surface of the DNA microarray is washed to remove the nucleic acid not bonding to the probe, and is dried, as necessary. The image of the microarray is picked up: specifically exciting light is projected to the DNA microarray on the base plate, and fluorescent image is picked up by a sensor. The fluorescence intensity of the probe of a DNA microarray fluorescence image is calculated in the calculation step 507.

Figure 6A:
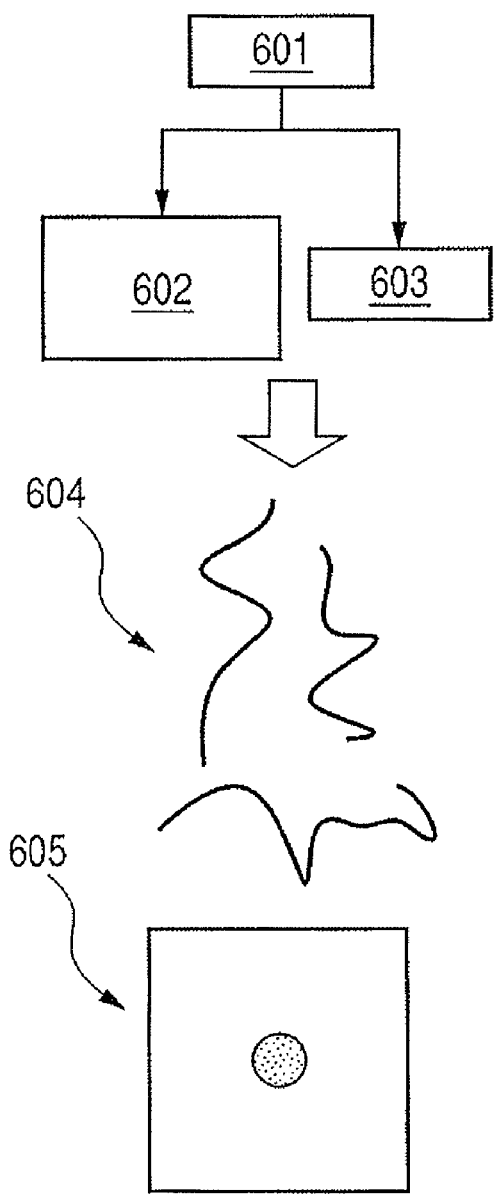
FIGS. 6A and 6B are drawings for describing the principle of identifying bacteria of an infectious disease with a DNA microarray.

The principle of the process for identification of a bacterium of infectious disease is described with reference to FIGS. 6A and 6B. In this description, the DNA array is assumed to be prepared to identify *Staphylococcus aureus* and *Escherichia coli*. FIG. 6A illustrates a treatment series for a wild strain of *Staphilococcus aureus*, and FIG. 6B illustrates a treatment series for a wild strain of *Escherichia coli*, illustrating respectively a flow of treatment of a blood of a patient infected with *Staphilococcus aureus*, and a flow of treatment of a blood of a patient infected with *Escherichia coli*.

The above two treatment processes are conducted similarly in principle. That is, a DNA is extracted, for example, from blood or sputum of a patient (601). In this operation, DNA of the human body cells can be contained in the extract. When the amount of the extracted DNA is not sufficient, the DNA is amplified by PCR or a like method. In this amplification step, a fluorescent substance or a substance capable of bonding to a fluorescent substance is added thereto generally as a label (602). In the cases where the amplification is not conducted, a fluorescent substance or a substance capable of bonding to a fluorescent substance is added while the complementary chain is formed, or a fluorescent substance or a substance capable of bonding to a fluorescent substance is added, as a label directly to the extracted DNA (603).

For PCR amplification, for identification of a bacterium of infectious disease, generally a portion of the base sequence of 16s rRNA, a ribosome RNA, is amplified. In the treatment process of FIGS. 6A and 6B, nearly the same PCR primers are used for *Staphylococcus aureus* in FIG. 6A and for *Escherichia coli* in FIG. 6B. More specifically, in these cases, multiplex PCR is conducted by use of a primer set which enables amplification of a portion coding of 16s rRNA of any bacteria.

Figure 6B:
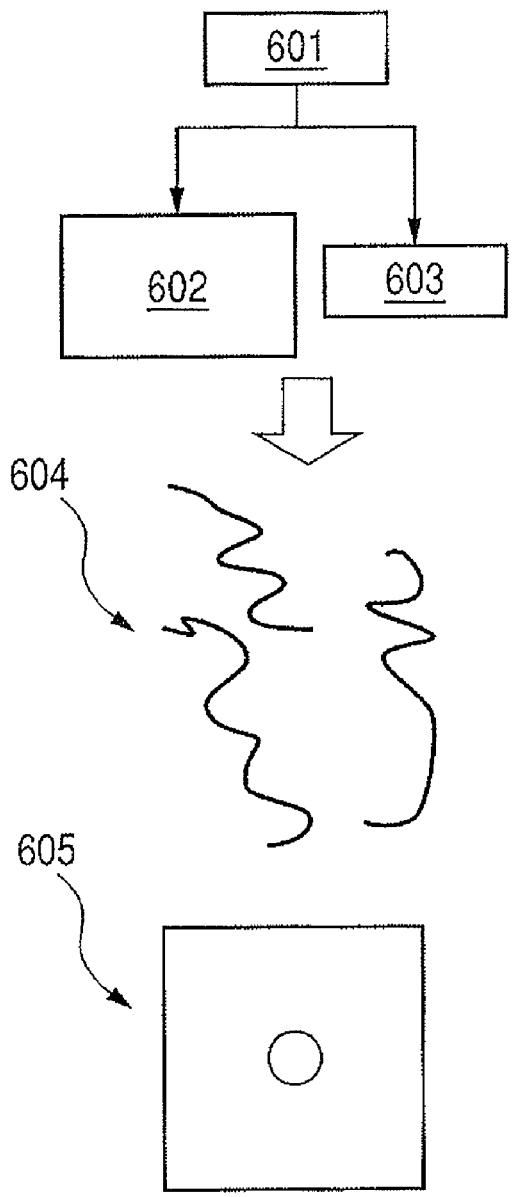

DNA microarray 605 designed for identification of *Staphilococcus aureus* will cause a positive reaction of the spots in hybridization solution 604 in FIG. 6A, whereas it will cause a negative reaction of the spots in hybridization solution 604 in FIG. 6B.

In DNA microarray 605 designed for identification of *Escherichia coli*, the spot will cause a negative reaction in hybridization solution 604 in FIG. 6A, whereas the spot will cause a positive reaction in hybridization solution 604 in FIG. 6B. Naturally, the DNA microarray may contain several kinds of spots specific to different kinds of bacteria for identification of infective bacteria.

Next, the procedure of operations described above with reference to FIG. 5 is described more specifically for identifying a bacteria causing an infectious disease. The process for identification of a living matter according to the present invention is applicable not only to the identification of bacteria causing an infectious disease described below, but also to determination of human physical constitution like MHC, and to analysis of DNA and RNA relating to diseases like cancer.

EXAMPLE

I. Preparation of Probe DNA

The nucleic acid sequences (I-n) (n is a numerical symbol) shown in Table 1 were designed as probes for detecting *Enterobacter cloacae*. Specifically, the probe base sequences shown below were selected from the genome portion coding 16s rRNA. These probe base sequences were designed to have a specially high specificity to the objective bacteria, and giving sensitivity to the hybridization with little variation.

TABLE 1

| I-1 | SEQ ID NO: 1 |
|---|---|
| I-2 | SEQ ID NO: 2 |
| I-3 | SEQ ID NO: 3 |
| I-4 | SEQ ID NO: 4 |
| I-5 | SEQ ID NO: 5 |
| I-6 | SEQ ID NO: 6 |

To the respective probes shown in the table above, after the synthesis of the probes, a thiol group was introduced at 5'-terminal of the nucleic acid as the functional group for immobilization in the microarray according to a conventional method. After the introduction of the functional group, the probes were purified and freeze-dried. The probes as internal references were stored in a refrigerator at −30° C.

Probe sets were designed in the same manner as above for the bacteria of *Staphylococcus aureus* (A-n), *Staphylococcus epidermidis* (B-n), *Escherichia coli* (C-n), *Klebsiella pneumoniae* (D-n), *Pseudomonas aerugnosa* (E-n), *Serratia marcescens* (F-n), *Streptococcus pneumoniae* (G-n), *Homophilus influenzae* (H-n), and *Enterococcus faecalis* (J-n).

TABLE 2

| A-1 | SEQ ID NO: 7 |
|---|---|
| A-2 | SEQ ID NO: 8 |
| A-3 | SEQ ID NO: 9 |
| A-4 | SEQ ID NO: 10 |
| A-5 | SEQ ID NO: 11 |
| A-6 | SEQ ID NO: 12 |

TABLE 3

| B-1 | SEQ ID NO: 13 |
|---|---|
| B-2 | SEQ ID NO: 14 |
| B-3 | SEQ ID NO: 15 |
| B-4 | SEQ ID NO: 16 |
| B-5 | SEQ ID NO: 17 |
| B-6 | SEQ ID NO: 18 |

TABLE 4

| | |
|---|---|
| C-1 | SEQ ID NO: 19 |
| C-2 | SEQ ID NO: 20 |
| C-3 | SEQ ID NO: 21 |
| C-4 | SEQ ID NO: 22 |
| C-5 | SEQ ID NO: 23 |
| C-6 | SEQ ID NO: 24 |

TABLE 5

| | |
|---|---|
| D-1 | SEQ ID NO: 25 |
| D-2 | SEQ ID NO: 26 |
| D-3 | SEQ ID NO: 27 |
| D-4 | SEQ ID NO: 28 |
| D-5 | SEQ ID NO: 29 |
| D-6 | SEQ ID NO: 30 |

TABLE 6

| | |
|---|---|
| E-1 | SEQ ID NO: 31 |
| E-2 | SEQ ID NO: 32 |
| E-3 | SEQ ID NO: 33 |
| E-4 | SEQ ID NO: 34 |
| E-5 | SEQ ID NO: 35 |
| E-6 | SEQ ID NO: 36 |

TABLE 7

| | |
|---|---|
| F-1 | SEQ ID NO: 37 |
| F-2 | SEQ ID NO: 38 |
| F-3 | SEQ ID NO: 39 |
| F-4 | SEQ ID NO: 40 |
| F-5 | SEQ ID NO: 41 |
| F-6 | SEQ ID NO: 42 |

TABLE 8

| | |
|---|---|
| G-1 | SEQ ID NO: 43 |
| G-2 | SEQ ID NO: 44 |
| G-3 | SEQ ID NO: 45 |
| G-4 | SEQ ID NO: 46 |
| G-5 | SEQ ID NO: 47 |
| G-6 | SEQ ID NO: 48 |

TABLE 9

| | |
|---|---|
| H-1 | SEQ ID NO: 49 |
| H-2 | SEQ ID NO: 50 |
| H-3 | SEQ ID NO: 51 |
| H-4 | SEQ ID NO: 52 |
| H-5 | SEQ ID NO: 53 |
| H-6 | SEQ ID NO: 54 |

TABLE 10

| | |
|---|---|
| J-1 | SEQ ID NO: 55 |
| J-2 | SEQ ID NO: 56 |
| J-3 | SEQ ID NO: 57 |
| J-4 | SEQ ID NO: 58 |
| J-5 | SEQ ID NO: 59 |
| J-6 | SEQ ID NO: 60 |

II. Preparation of PCR Primer for Probe Amplification

The nucleic acid sequences shown in Table 11 below were designed as PCR primers for amplifying 16s rRNA (target nucleic acid) for detection of phlogogenic bacteria. Specifically, probe sets for amplifying the genome portion coding a 16s rRNA were designed. That is, primers were designed which have lengths of about 1500 bases, and having the melting temperatures in a narrow range at the both end portions of the 16s rRNA coding region. Plural kinds of primers were designed for amplifying simultaneously plural 16s rRNA coding regions on variant strains or genomes.

TABLE 11

| | Primer No. | Sequence |
|---|---|---|
| Forward primer | F-1 | SEQ ID NO: 61 |
| | F-2 | SEQ ID NO: 62 |
| | F-3 | SEQ ID NO: 63 |
| Reverse primer | R-1 | SEQ ID NO: 64 |
| | R-2 | SEQ ID NO: 65 |
| | R-3 | SEQ ID NO: 66 |

The primers in the Table after the synthesis were purified by high speed chromatography (HPLC). The three forward primers are mixed together, and the three reverse primers are mixed together. The primer mixtures are respectively dissolved in separate TE buffer solutions at the final concentration of each of the primers of 10 pmol/μL.

III. Extraction of *Enterobacter Cloacae* Genome DNA (Model Specimen)

III-1. Cultivation of Microorganism and Pretreatment for Genome DNA Extraction

A standard strain of *Enterobacter cloacae* was cultivated in a conventional manner. A 1.0 mL portion of this microorganism culture liquid (OD600=0.7) was placed in a 1.5-mL micro-tube and was subjected to centrifugation (8500 rpm, 5 min., 4° C.) for recovery of the microorganism cells. The supernatant was discarded. The microorganism cells were suspended again in 300 μL of an Enzyme Buffer (50 mM Tris-HCl: pH 8.0, 25 mM EDTA) by use of a mixer. The microorganism suspension was subjected to centrifugation (8500 rpm, 5 min., 4° C.) again for recovery of the microorganism cells. After discarding the supernatant liquid, the recovered microorganism cells were suspended again in the enzyme solution shown below by use of a mixer.

Lysozyme 50 μL (20 mg/mL in Enzyme Buffer)

N-Acetylmuramidase SG 50 μL (0.2 mg/mL in Enzyme Buffer)

The microorganism suspension liquid in the enzyme solution was kept standing in an incubator at 37° C. for 30 minutes to dissolve of the cell walls.

III-2. Genome Extraction

The genome DNA of the microorganism was extracted with a nucleic acid purification kit (MagExtractor-Genome-: manufactured by TOYOBO Co.) through the steps below.

Step 1: To the above-pretreated microorganism suspension liquid, was added 750 μL of dissolution-adsorption liquid and 40 μL of magnetic beads. The mixture was agitated violently by a tube mixer for 10 minutes.

Step 2: The micro-tube was set on a separation stand (Magical Trapper) and was kept standing for 30 seconds to collect the magnetic particles on the tube wall. The supernatant liquid was discarded with the micro-tube kept set at the stand.

Step 3: A 900 μL portion of a washing solution was added thereto, and the mixture was agitated for about 5 seconds by a mixer to form a suspension.

Step 4: The micro-tube was set on a separation stand (Magical Trapper) and was kept standing for 30 seconds to collect the magnetic particles on the tube wall. The supernatant liquid was discarded with the micro-tube kept at the stand.

Step 5: The operation of Step 3 and Step 4 were repeated and further the washing was conducted.

Step 6: Thereto, 900 μL of 70% ethanol was added, and the mixture was agitated for 5 seconds by a mixer to form a suspension.

Step 7: The micro-tube was set on a separation stand (Magical Trapper) and was kept standing for 30 seconds to collect the magnetic particles on the tube wall. The supernatant liquid was discarded with the micro-tube set at the stand.

Step 8: The above Steps 6 and 7 were repeated for second washing with 70% ethanol.

Step 9: To the recovered magnetic particles, 100 μL of pure water was added, and the mixture was agitated by a tube mixer for 10 minutes.

Step 10: The micro-tube was set on a separation stand (Magical Trapper) and was kept standing for 30 seconds to collect the magnetic particles on the tube wall. The supernatant liquid was recovered into a fresh tube with the micro-tube kept set at the stand.

III-3. Inspection of Recovered Genome DNA

The recovered genome DNA of the microorganism (Enterobacter cloacae) was inspected for the quality (contamination with a low-molecular nucleic acid, and degree of decomposition) and the recovered quantity by agarose electrophoresis and light absorbance at 260/280 nm in a conventional manner.

In this Example, the genome DNA was recovered in an amount of about 10 μg without degradation of the genome DNA and contamination with rRNA.

The recovered genome DNA was dissolved at a final concentration of 50 ng/μL in a TE buffer solution for use in the following operation.

IV. Preparation of DNA Microarray

IV-1. Cleaning of Glass Base Plate

A glass base plate of synthetic silica (size: 25 mm×75 mm×1 mm; Iiyama Tokushu Glass Co.) is placed on a heat-resistant alkali-resistant rack. The base plate was immersed in an ultrasonic cleaning solution at a prescribed concentration overnight. Then the base plate in the cleaning solution was cleaned ultrasonically for 20 minutes. Thereafter, the base plate was taken out from the cleaning solution, washed simply with pure water, and cleaned ultrasonically in extra-pure water for 20 minutes. Next the base plate was immersed in an aqueous EN sodium hydroxide solution at 80° C. for 10 minutes. The base plate was further washed with pure water and with extra-pure water successively to obtain a quartz glass base plate for DNA chip.

IV-2. Surface Treatment

A silane coupling agent, KBM-603 (Shin-Etsu Silicone Co.), was dissolved in pure water at a concentration of 1%, and the mixture was stirred at room temperature for two hours. The above-prepared glass base plate was immersed in this aqueous silane coupling agent solution and was kept standing at room temperature for 20 minutes. Then the glass base plate was taken out from the solution and washed simply with pure water, and dried by blow of nitrogen gas against the both faces of the base plate. The dried base plate was baked at 120° C. for one hour in an oven to complete the coupling agent treatment to introduce the amino groups on the base plate surface. Separately, N-(6-maleimdocaproyloxy)succinimide (hereinafter referred to as "EMCS" (Dojin Kagaku Kenkyusho) was dissolved in a dimethylsulfoxide-ethanol (1:1) mixture solvent at a concentration of 0.3 mg/mL. The above glass base plate having been baked and cooled was immersed in this EMCS solution at room temperature for two hours. The above treatment causes reaction of the amino groups introduced by the silane-coupling agent with the succinimide group of the EMCS to introduce maleimide group on the glass substrate surface. The glass plate was taken out from the EMCS solution and was washed with the mixture solvent used for MCS dissolution, and then with ethanol, and dried in a nitrogen atmosphere.

IV-3. Probe DNA

The probes prepared in the above Operation I for microorganism detection were respectively dissolved in pure water, and were pipetted to obtain a final concentration (at ink dissolution) of 10 μM. The pipetted matters were freeze-dried to eliminate the water.

IV-4. Ejection of DNA, and Bonding Thereof to Base Plate

An aqueous solution was prepared which contains glycerin (7.5 wt %), thiodiglycol (7.5 wt %), urea (7.5 wt %), and Acethylenol EH (1.0 wt %, Kawaken Fine Chemical Co.). The six probes having been prepared (Table 1) were dissolved separately in the above mixture solvent at a prescribed concentration. The resulting DNA solutions were charged to ink tanks of an ink-jet printer (BJF-850: Canon K. K.). The same printing head as those of the above printer were also provided.

A liquid-jet printer apparatus having a printing head for printing on a flat plate was prepared. This printer apparatus was capable of spotting the DNA solution at a spotting volume of about 5 pico-liters at a pitch of 120 micrometers.

With this printer apparatus, printing was conducted on a glass base plate to prepare a DNA microarray. After confirmation of spot formation of six kinds of probes, the glass base plate having the probes was kept standing in a humidified chamber for 30 minutes to cause reaction of the maleimide group on the base plate surface with the thiol groups at the terminals of the nucleic acid probe.

IV-5. Washing

After 30 minutes of the reaction, the solution of DNA remaining unreacted on the surface was washed off with a 10-mM phosphate buffer solution containing 100-mM of NaCl (pH: 7.0) to obtain a DNA microarray immobilizing single stranded DNAs on the glass base plate surface.

V. Amplification and Labeling of Sample (PCR Amplification and Fluorescence Labeling)

The amplification and labeling of the DNA of the microorganism of the sample are described below. The reaction solution having the composition shown below was employed in the amplification reaction.

| | |
|---|---|
| Premix PCR reagent (TAKARA ExTaq) | 25 μL |
| Template Genome DNA | 2 μL (100 ng) |
| Forward Primer mix | 2 μL (20 pmol/tube) |
| Reverse Primer mix | 2 μL (20 pmol/tube) |
| Cy-3 dUTP (1 mM) | 2 μL (2 nmol/tube) |
| $H_2O$ | 17 μL |
| Total | 50 μL |

The reaction solution having the above composition was subjected to amplification reaction according to the protocol below with a commercial thermal cycler:

| | | |
|---|---|---|
| 95° C. | 10 min. | |
| 92° C. | 45 sec. | |
| 55° C. | 45 sec. | 35 Cycles |
| 72° C. | 45 sec. | |
| 72° C. | 10 min. | | wherein 35 cycles between 92° C. and 72° C. were carried out.

After the reaction, the primer was removed by a purification column (QIAGEN QIAquick PCR Purification Kit), and the amplification product is determined quantitatively for use as the labeled sample.

VI. Hybridization

The detection reaction was conducted by using the DNA array prepared through the above operation of "IV. Preparation of DNA Microarray", and the labeled samples prepared through the above process of "Amplification and Labeling of Sample (PCR Amplification and Labeling)".

VI-1. Blocking by DNA Microarray

BSA (Bovine Serum Albumin Fraction V; Sigma Co.) is dissolved at a concentration of 1 wt % in a 10 mM phosphate buffer solution containing 100 mM NaCl. The DNA microarray prepared through the above operation of "Preparation of DNA Microarray" was immersed in this BSA solution at room temperature for two hours to conduct blocking. After completion of the blocking, the DNA microarray was washed with 2×SSC solution (containing 300 mM of NaCl, 30 mM of sodium citrate (trisodium citrate dihydrate, $C_6H_5NO_7Na_3.2H_2O$), pH 7.0) containing 0.1 wt % SDS (sodium dodecylsulfate)), rinsed with pure water, and dried by a spin drier.

VI-2. Hybridization Reaction

The spin-dried DNA microarray is placed in a hybridization apparatus (Hybridization Station: Genomic Solutions Inc.) The hybridization reaction is allowed to proceed in the solution and conditions shown below.

<Hybridization Solution>

6×SSPE/10% formamide/target (entire of $2^{nd}$ PCR product)

(6×SSPE: NaCl 900 mM, $NaH_2PO_4.H_2O$ 60 mM, EDTA 6 mM, pH 7.4)

<Hybridization Conditions>

65° C. 3 min→92° C. 2 min→45° C. 3 hr→Washing with 2×SSC/0.1% SDS at 25° C.→Washing with 2×SSC at 20° C.→(Rinsing with $H_2O$, manually)→Spin drying VII. Detection of Microorganism (Fluorometry)

Figure 7:
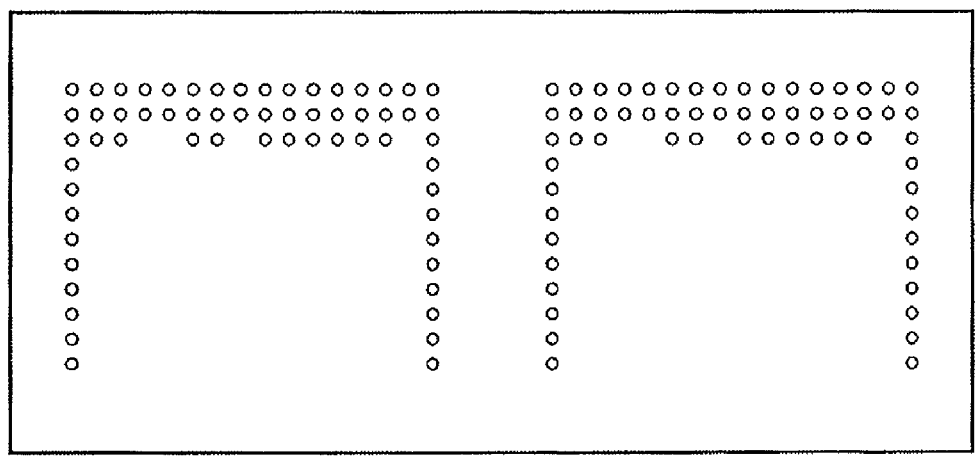
FIG. 7 illustrates a fluorescence image of a DNA microarray derived from Staphylococcus aureus.

After the hybridization reaction, the DNA microarray was placed on the apparatus illustrated in FIG. 3 to take the fluorescence image. FIG. 7 shows a fluorescence image resulting from *Staphylococcus aureus*. The fluorescence luminances of the probes of the respective spots were digitized, and therefrom the presence or absence of *Staphylococcus aureus* was determined. Although this determination can visually be made, automatic determination is convenient by comparison of the derived image with standard patterns taken preliminarily from the respective infectious microorganisms and stored in the data base. For the image analysis, conventional analysis techniques are applicable.

Figure 8:
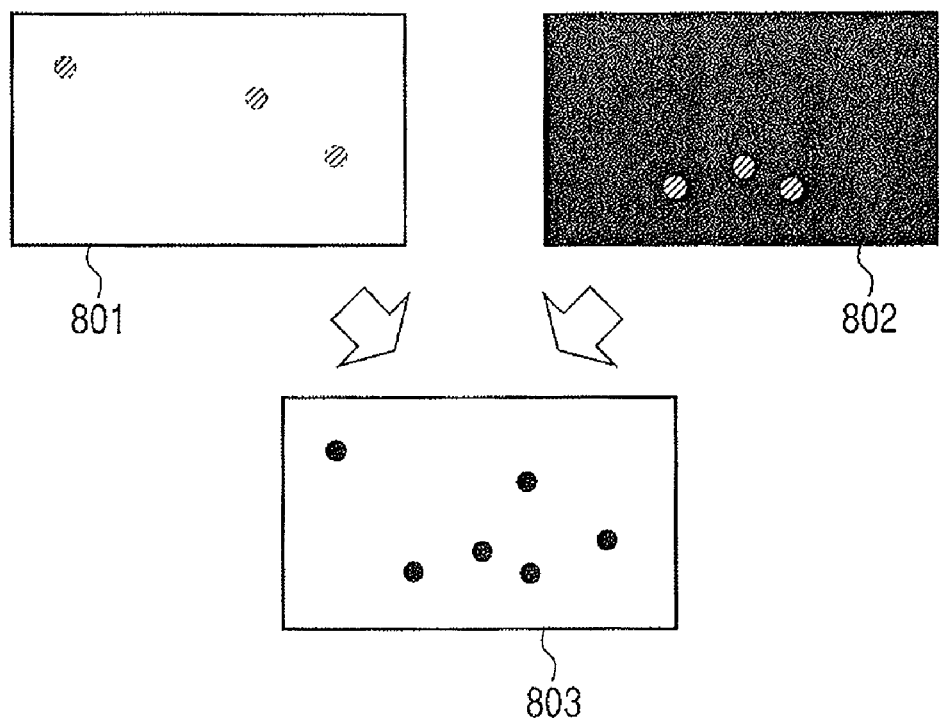
FIG. 8 is a drawing for describing a method of detection of a defective picture element of the sensor.

FIG. 8 is a drawing for describing a method of detection of a defective picture element of the sensor according to an embodiment of the present invention, corresponding to Step 101 in FIG. 1. In FIG. 8, drawing 801 illustrates a white image taken by exposing all of the picture elements of the sensor to light for a time sufficient to saturate all the picture elements. The picture element outputting a signal other than the saturated white level is detected as a defective picture element. Drawing 802 illustrates a black image taken by intercepting all of the picture elements of the sensor from light. The picture element outputting a signal stronger than that a noise component like a dark current other than the black level is detected as a defective picture element. Drawing 803 illustrates information on defective picture elements derived by combination of the detection results of drawings 801 and 802. Table 12 shows an example of the element defect information derived as above. The information data on the defective picture element is represented by the defective spot number, and the X-coordinate and Y-coordinate of the picture element position. Step 101 and Step 102 in FIG. 1 may be conduced timely: the information on the defective picture elements of the image sensor is not fixed, but may be renewed at a suitable time.

TABLE 12

| No. | X | Y |
|---|---|---|
| 1 | 318 | 230 |
| 2 | 369 | 233 |
| 3 | 372 | 232 |
| 4 | 372 | 233 |
| 5 | 372 | 234 |
| 6 | 355 | 276 |
| 7 | 358 | 276 |
| 8 | 465 | 284 |
| 9 | 468 | 287 |

Figure 9:
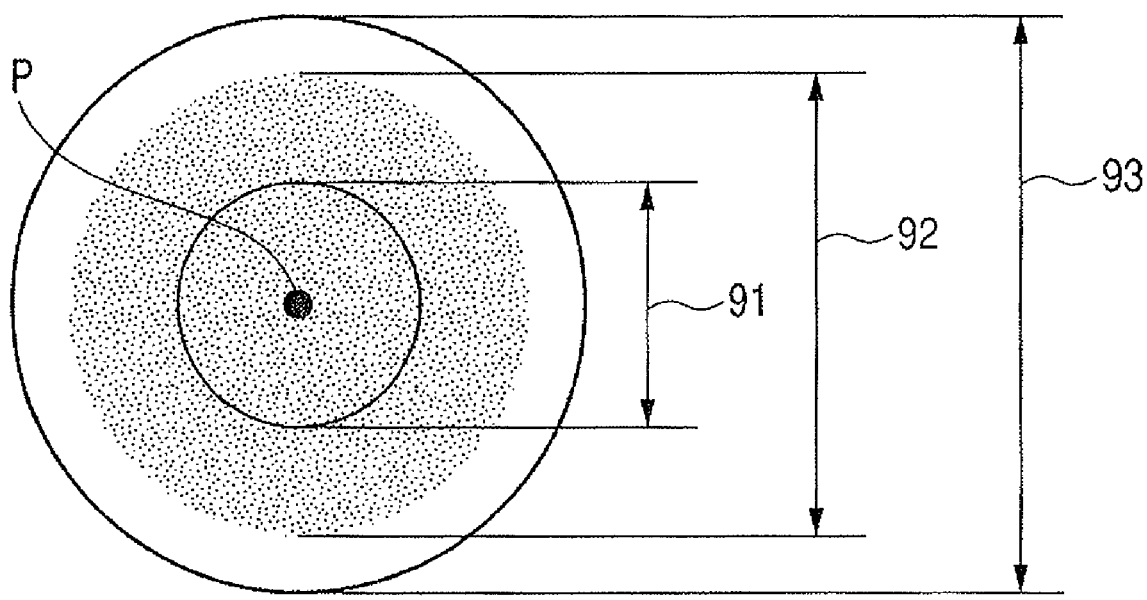
FIG. 9 is a drawing for describing an importance level of the spot area of a DNA microarray.

FIG. 9 is a drawing for describing the importance level of the spot area of the DNA microarray. The area including the spot center (coordinates: x1, y1) which is frequently used in measuring the spot luminance is denoted by R1. Diameter 91 of the circular area R1 is defined as the luminance diameter. The area of the spot outside the central area R1 is denoted by R2. Diameter 92 of the circle surrounding the area R2 is denoted by the spot diameter. A certain range outside the spot is called a background area R3, and the diameter 93 of the circle surrounding the area R3 is denoted by a BG diameter. The coordinates (x1, y1) of the center may be fixed or variable. The center coordinates may be fixed in the case where the accuracy of the spotting on the microarray is high. The spot diameter depends on the amount of ejection of the DNA solution in the DNA microarray formation. The luminance diameter is selected to be smaller than the spot diameter and to be useful for measurement of the spot luminance. The BG diameter is selected to be larger than the spot diameter and to be useful for measurement of the background luminance. These values are memorized in memory 203.

The information taken out from memory 203 in Step 103 in FIG. 1 includes luminance diameters, spot diameters, and BG diameters shown in Table 13; the spot center coordinates shown in Table 14; and the importance levels, namely weighting factors, of the probes shown in Table 15. The center coordinates are represented by taking the standard points in the DNA microarray. The probe importance levels of the probes are represented by a factor depending on the importance of the probes of the microarray: the spot factor is made higher (importance level) for more importance spots.

The imaging size (μm) of the microarray corresponding to one picture element of the sensor is the quotient of the size of one picture element of the sensor divided by the imaging multiplication factor. For example, in imaging with the picture element size of 6.7 μm at the imaging multiplication factor of 2.6, the imaging size for one picture element is 6.7

μm/2.6≈2.58 μm. This size can be a length of one side of the square element, or a diameter of a circle equivalent to it.

Table 16 shows the sizes (μm) of the luminance diameter, the spot diameter, and the BG diameter size of the spot, and the number of the picture elements corresponding to one spot (corresponding picture element numbers) derived by dividing the above sizes of the spot by the imaging size 2.58 μm.

The position of the defective image element of the image sensor is associated with the coordinates of the position in the spot area of the DNA microarray in a following manner. Firstly, a reference probe is selected at the left top portion of the image of the DNA microarray (imaging area). Then a reference picture element for imaging is selected to correspond to the reference probe as the standard position on the DNA microarray. This reference probe is brought to the reference point of the DNA microarray. Then the position on the DNA microarray corresponding to the defective picture element of the image sensor is calculated based on the imaging size (μm) of the picture element of the sensor. Finally, the position of the defective picture element is calculated to confirm whether or not it is within the spot area of the DNA microarray. Table 17 shows an example of the coordinate association utilizing the information of the defective picture element shown in Table 12. In this example of calculation, the coordinates of the reference picture element for imaging is assumed to be X=300, Y=200, and the imaging size of the one picture element on the microarray is assumed to be 2.58 μm.

TABLE 13

| Item | Size (μm) |
| --- | --- |
| Luminance diameter | 25 |
| Spot diameter | 50 |
| BG diameter | 70 |

TABLE 14

| Spot No. | X (μm) | Y (μm) |
| --- | --- | --- |
| Spot 1 | 50 | 80 |
| Spot 2 | 170 | 80 |
| Spot 3 | 290 | 80 |
| Spot 4 | 410 | 80 |
| Spot 5 | 50 | 200 |
| Spot 6 | 170 | 200 |
| Spot 7 | 290 | 200 |
| Spot 8 | 410 | 200 |

TABLE 15

| Spot No. | Importance level |
| --- | --- |
| Spot 1 | 2.0 |
| Spot 2 | 1.0 |
| Spot 3 | 1.0 |
| Spot 4 | 1.0 |
| Spot 5 | 2.0 |
| Spot 6 | 1.0 |
| Spot 7 | 1.0 |
| Spot 8 | 1.0 |

TABLE 16

| Item | Size (μm) | Corresponding picture element number |
| --- | --- | --- |
| Luminance | 25 | 9.69 |
| Spot diameter | 50 | 19.36 |
| BG diameter | 70 | 27.13 |

TABLE 17

Coordinate of the imaging reference picture element: X, 300; Y, 200.
Size for one picture element: 2.58 μm

| | Position of defective picture element of sensor | | Corresponding position on DNA microarray (range) | |
| --- | --- | --- | --- | --- |
| No. | X [picture element] | Y [picture element] | X range: start-finish (μm) | Y range: Start-finish (μm) |
| 1 | 318 | 230 | 43.86-46.44 | 74.82-77.40 |
| 2 | 369 | 233 | 175.44-178.02 | 82.56-85.14 |
| 3 | 372 | 232 | 183.18-185.76 | 79.98-82.56 |
| 4 | 372 | 233 | 183.18-185.76 | 82.56-85.14 |
| 5 | 372 | 234 | 183.18-185.76 | 85.14-87.72 |
| 6 | 355 | 276 | 139.32-141.90 | 193.50-196.08 |
| 7 | 358 | 276 | 147.06-149.64 | 193.50-196.08 |
| 8 | 465 | 284 | 423.12-425.70 | 214.14-216.72 |
| 9 | 468 | 287 | 430.86-433.44 | 221.88-224.46 |

Figure 10A:
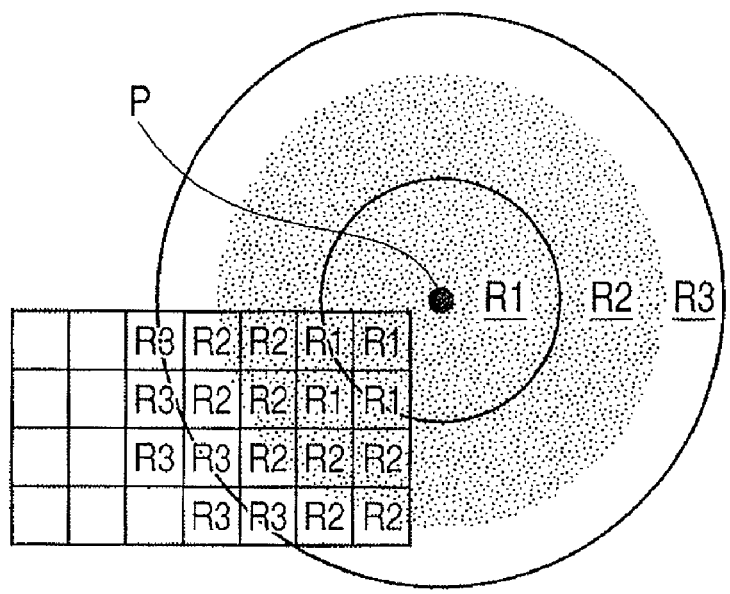
FIGS. 10A and 10B are drawings for describing correspondence of sensor picture elements with a spot area of a microarray.
Figure 10B:
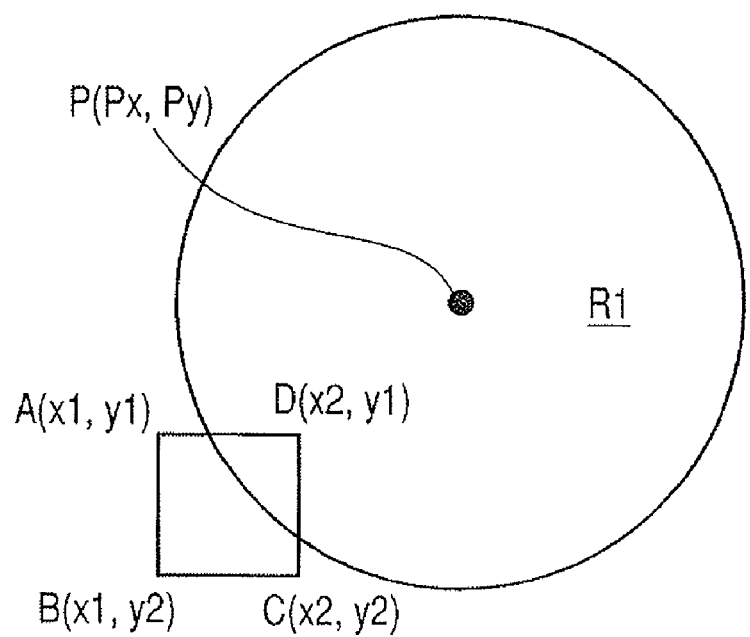

FIGS. 10A and 10B are employed for describing the positional correspondence between the sensor element and the spot area. When a region of a sensor picture element is included at least partly in a spot area (R1, R2, and R3) or in contact with the spot area, the sensor picture element is regarded to correspond to that spot area. The assignment of the picture element to the spot area is decided in the priority order of R1, R2, and R3. For example, a sensor picture element relating to R1 area of a spot is assigned to the R1 area of the spot, even if it relates also to R2 or R3 of the spot. The circular region of a spot area R1 having the center at the coordinate (Px, Py) and a radius r is represented by Equation 1. When a region of a sensor picture element is in a shape of a square formed by connecting a point A (coordinate x1, y1), a point B (coordinates x1, y2), a point C (coordinates x2, y2), and a point D (coordinate x2, y1), the respective lines forming the square are represented by Equations 2, 3, 4, and 5. When at least one of the lines is included by or comes to be in contact with the circle R1, the sensor picture element is assigned to the R1 area of the spot.

$$\text{Circle } R1: (X-Px)^2 + (Y-py)^2 \leq r^2 \quad \text{(Equation 1)}$$

$$\text{Line segment } AB: X=x1 (y1 \leq y \leq y2) \quad \text{(Equation 2)}$$

$$\text{Line segment } DC: X=x2 (y1 \leq y \leq y2) \quad \text{(Equation 3)}$$

$$\text{Line segment } AD: Y=y1 (x1 \leq x \leq x2) \quad \text{(Equation 4)}$$

$$\text{Line segment } BC: Y=y2 (x1 \leq x \leq x2) \quad \text{(Equation 5)}$$

A calculation example is shown here whether or not the defective picture element No. 1 in Table 17 is included in the spot area R1 of Spot 1 in Table 14. Equation 6 shows the region R1 of the circle of Spot 1 having the center at the coordinates (50, 80) and a radius (25/2). Equation 7 shows the line segment AB connecting the point A (coordinates 43.86, 74.82) with the point B (coordinates 43.86, 77.40).

$$\text{Circle } R1: (X-50)^2+(Y-80)^2 \leq (25/2)^2 \quad \text{(Equation 6)}$$

$$\text{Line Segment } AB: X=43.86\ (74.82 \leq Y \leq 77.40) \quad \text{(Equation 7)}$$

Substitution of X in Equation 6 by X=43.86 in Equation 7 gives the solution below.

$$69.11 \leq Y \leq 90.89$$

The line segment AB of the defective picture element has the value Y in the range between 74.82 and 77.40. Therefore the line AB is assigned to the spot area of R1 of Spot 1. In this example, the line segments DC, AD, and BC are confirmed to be assigned to circle R1 by the similar calculation as above.

Figure 11:
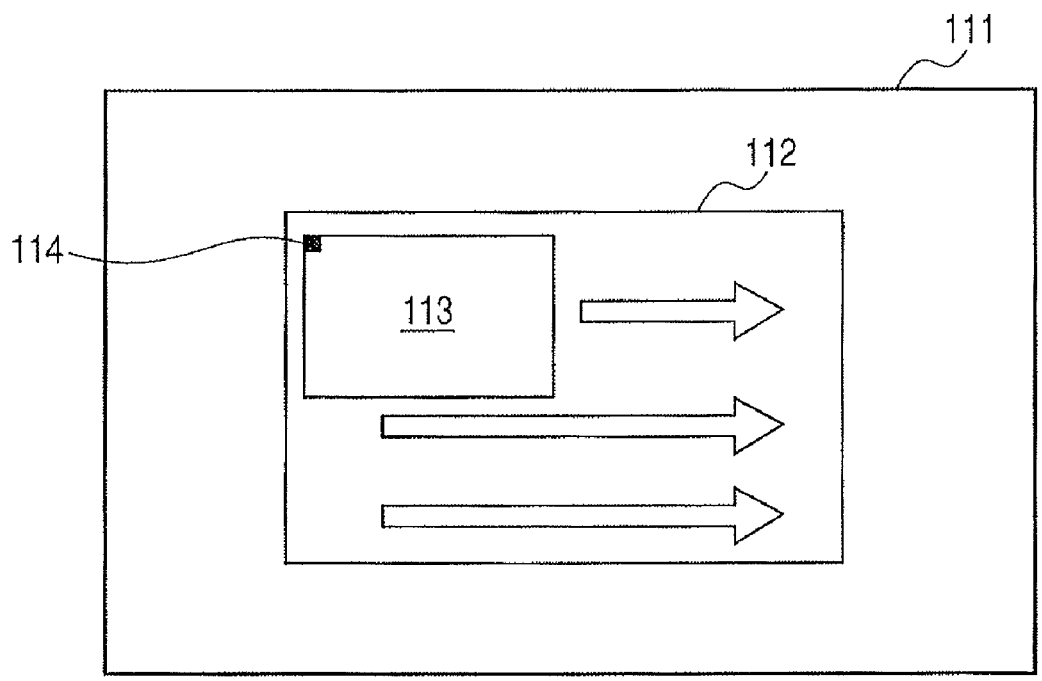
FIG. 11 is a drawing for describing an area for picking-up of a fluorescence image of a DNA microarray.

The fluorescence imaging area of a DNA microarray is described by reference to FIG. 11. In this description, as an example, in area 111 of a DNA microarray where a fluorescence image is detectable by the sensor, the central portion which is considered to be less affected by a noise is selected as the detection area 112. In the detection area, the imaging area 113 is shifted stepwise by a size of one picture element, and score is calculated for defective picture elements in all positions of the imaging area. In the picture element shift steps, firstly the reference picture element 114 of imaging is counterposed to the reference point of the DNA microarray, and the imaging area 113 is shifted stepwise by a size of one picture element. Thereby the position of the imaging area is selected to obtain the minimum of the score. When plural positions are found for the minimum score, the imaging area is preferably selected to be closer to the center of the detection of the sensor.

Figure 12:
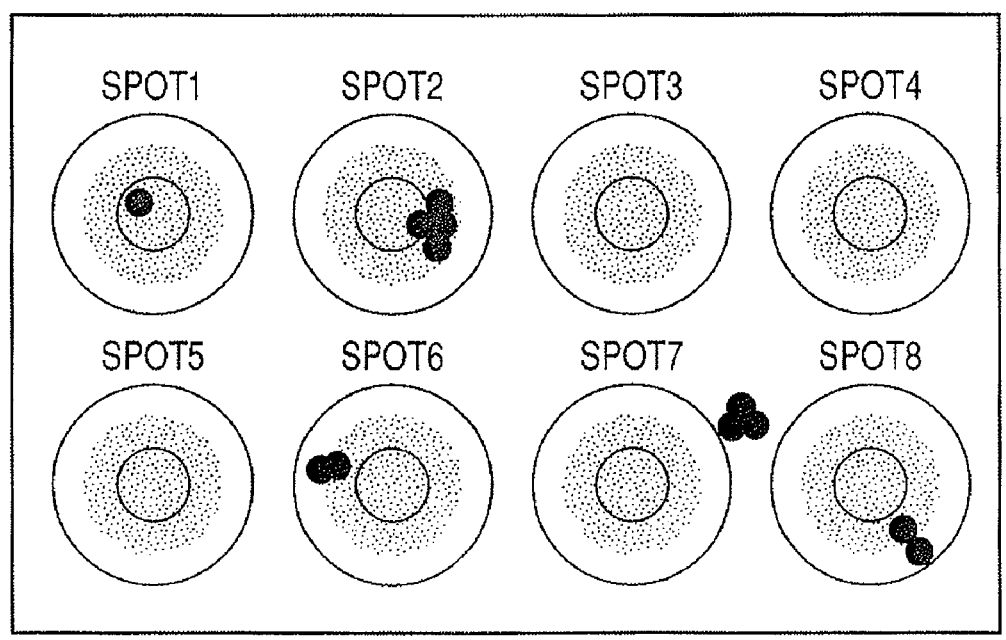
FIG. 12 is a drawing for describing an example of score calculation of defective image elements of a sensor.

The calculation of the score of the defective sensor element of the sensor is described by reference to FIG. 12. The score is calculated from the information on a defective image pigment shown in Table 12 and spot information shown in Tables 13, 14, and 15. A defective picture element corresponding to an R1 area is counted as 10 points; a defective picture element corresponding to an R2 area is counted as 5 points; and a defective picture element corresponding to an R3 area is counted as one point. A score calculation result is shown below for the case where the defective picture elements are found in Spot 1, one in R1 area; in Spot 2, one in R1 area and three in R2 area; in Spot 6, one in R2 area and one in R3 area; and in Spot 8, one in R2 area and one in R3 area.

$$^{Spot-1}(10p \times 1) \times 2.0 +\ ^{Spot-2}(10p \times 1 + 20p \times 3) \times 1.0 +\ ^{Spot-6}(5p \times 1 + 1p \times 1) \times 1.0 +\ ^{Spot-8}(5p \times 1 + 1p \times 1) \times 1.0 = 102 \text{ points}$$

In this calculation, the reaction region is divided into three areas of R1, R2, and R3 with weighting. However, the reaction region may be R1 only or be divided into two areas of R1 and R2. As described above, the overlap of the reaction area on defective element can be determined.

Figure 13A:
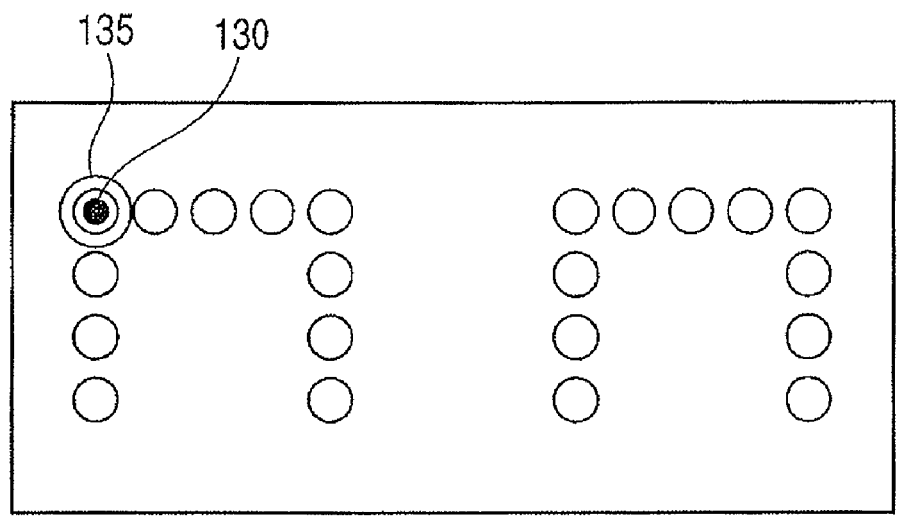
FIGS. 13A and 13B are drawings for describing positional registration of a sensor to a DNA microarray.
Figure 13B:
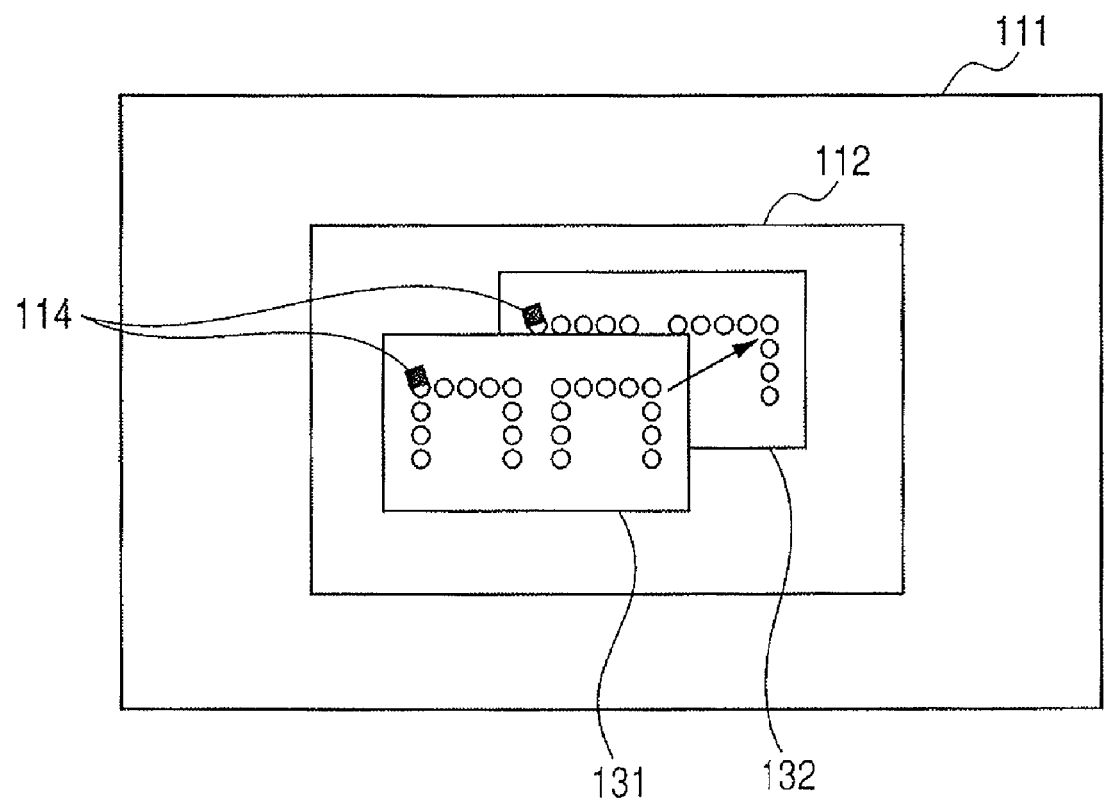

The positional registration of the sensor with the DNA microarray is described with reference to FIGS. 13A and 13B. In the drawing, the reference spot of the microarray is denoted by a numeral 135, and the reference picture element of imaging at the reference point is denoted by a numeral 114. For precise registration of the DNA microarray with the sensor in the imaging, trial imaging is conducted to recognize the reference point 130 from the position of the reference probe to detect the imaging position 131 at the moment. As the reference probe, a positive control probe on the DNA microarray is useful. Then florescent image is taken and the score calculation is conducted repeatedly with movement of the DNA microarray supporting plate. Incidentally, the positive control probe herein signifies a probe which is capable of giving steadily positive results under prescribed conditions. The positive control probe includes housekeeping genes, and probes having a sequence complementary to a target of an artificial nucleic acid sequence not found in nature.

After determination of the imaging position to achieve the minimum score of defects of the sensor picture elements, image analysis (pattern analysis) is conducted with the obtained fluorescence image for determination, for example, of bacteria causing an infectious disease. The image analysis may be conducted by any conventional method.

In the above embodiment, the image is picked at the position where the score of the defective picture element of the sensor comes to the minimum. However, the imaging position is not limited to that, but may be selected to be at a position where the score is lower than a prescribed certain level. The score calculation need not be based on the above algorithm, but may be based on another modified algorithm within the gist of the present invention.

The image sensor employed in the present invention may be a line-sensor having plural picture element arranged one-dimensionally.

The moving means in the present invention may be a mechanism for moving the image sensor in place of mechanism 309 for moving the microarray.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-213469, filed Aug. 4, 2006, which is hereby incorporated by reference herein in its entirety.

What is claimed is:

1. An inspection apparatus for inspecting a microarray comprising:
- an image sensor for imaging the microarray;
- a moving means for moving the image sensor relative to the microarray;
- a memory for memorizing the position of a defective picture element on the image sensor; and
- a controlling means which controls the steps of:
  (i) taking a first image of the microarray with the image sensor;
  (ii) obtaining the position of the defective picture element on the image sensor:
  (iii) determining an overlap state of an imaging area of the defective picture element on reaction areas on the microarray;
  (iv) controlling the moving means based on the result of the determination so that the defective picture element is disposed on a non-reaction area existing between the reaction areas; and
  (v) taking a second image of the microarray with the image sensor after the step (iv).

2. The inspection apparatus according to claim 1, wherein the controlling means calculates a score for determining the overlap state by shifting the position of the defective picture element relative to the reaction area, and adjusts the relative position of the microarray to the image sensor.

3. The inspection apparatus according to claim 2, wherein the memory memorizes information on a center position coordinate and a spot diameter of a spot area on the microarray.

4. The inspection apparatus according to claim 1, wherein the microarray is a DNA microarray.

5. The inspection apparatus according to claim 1, wherein the image sensor is an area sensor.

6. The inspection apparatus according to claim 5, wherein the information on the position of the defective picture element of the area sensor can be renewed.

* * * * *

SEQUENCE LISTING

<160> NUMBER OF SEQ ID NOS: 66

<210> SEQ ID NO 1
<211> LENGTH: 23
<212> TYPE: DNA
<213> ORGANISM: Artificial
<220> FEATURE:
<223> OTHER INFORMATION: Synthesized DNA probe

<400> SEQUENCE: 1
gtagcacaga gagcttgctc tcg                                            23

<210> SEQ ID NO 2
<211> LENGTH: 23
<212> TYPE: DNA
<213> ORGANISM: Artificial
<220> FEATURE:
<223> OTHER INFORMATION: Synthesized DNA probe

<400> SEQUENCE: 2
cggggaggaa ggtgttgtgg tta                                            23

<210> SEQ ID NO 3
<211> LENGTH: 23
<212> TYPE: DNA
<213> ORGANISM: Artificial
<220> FEATURE:
<223> OTHER INFORMATION: Synthesized DNA probe

<400> SEQUENCE: 3
accacagcaa ttgacgttac ccg                                            23

<210> SEQ ID NO 4
<211> LENGTH: 24
<212> TYPE: DNA
<213> ORGANISM: Artificial
<220> FEATURE:
<223> OTHER INFORMATION: Synthesized DNA probe

<400> SEQUENCE: 4
gcaattgacg ttacccgcag aaga                                           24

<210> SEQ ID NO 5
<211> LENGTH: 22
<212> TYPE: DNA
<213> ORGANISM: Artificial
<220> FEATURE:
<223> OTHER INFORMATION: Synthesized DNA probe

<400> SEQUENCE: 5
aggcggtctg tcaagtcgga tg                                             22

<210> SEQ ID NO 6
<211> LENGTH: 25
<212> TYPE: DNA
<213> ORGANISM: Artificial
<220> FEATURE:
<223> OTHER INFORMATION: Synthesized DNA probe

<400> SEQUENCE: 6
attcgaaact ggcaggctag agtct                                          25

<210> SEQ ID NO 7
<211> LENGTH: 25
<212> TYPE: DNA
<213> ORGANISM: Artificial
<220> FEATURE:
<223> OTHER INFORMATION: Synthesized DNA probe

<400> SEQUENCE: 7
tgtcacttat agatggatcc gcgct                                          25

<210> SEQ ID NO 8
<211> LENGTH: 26
<212> TYPE: DNA
<213> ORGANISM: Artificial

```
<220> FEATURE:
<223> OTHER INFORMATION: Synthesized DNA probe

<400> SEQUENCE: 8
tgtaagtaac tgtgcacatc ttgacg                                              26

<210> SEQ ID NO 9
<211> LENGTH: 26
<212> TYPE: DNA
<213> ORGANISM: Artificial
<220> FEATURE:
<223> OTHER INFORMATION: Synthesized DNA probe

<400> SEQUENCE: 9
acaactctag agatagagcc ttcccc                                              26

<210> SEQ ID NO 10
<211> LENGTH: 23
<212> TYPE: DNA
<213> ORGANISM: Artificial
<220> FEATURE:
<223> OTHER INFORMATION: Synthesized DNA probe

<400> SEQUENCE: 10
aatacaaagg gcagcgaaac cgc                                                 23

<210> SEQ ID NO 11
<211> LENGTH: 26
<212> TYPE: DNA
<213> ORGANISM: Artificial
<220> FEATURE:
<223> OTHER INFORMATION: Synthesized DNA probe

<400> SEQUENCE: 11
gtggagtaac cttttaggag ctagcc                                              26

<210> SEQ ID NO 12
<211> LENGTH: 25
<212> TYPE: DNA
<213> ORGANISM: Artificial
<220> FEATURE:
<223> OTHER INFORMATION: Synthesized DNA probe

<400> SEQUENCE: 12
taacctttta ggagctagcc gtcga                                               25

<210> SEQ ID NO 13
<211> LENGTH: 26
<212> TYPE: DNA
<213> ORGANISM: Artificial
<220> FEATURE:
<223> OTHER INFORMATION: Synthesized DNA probe

<400> SEQUENCE: 13
tagtgaaaga cggttttgct gtcact                                              26

<210> SEQ ID NO 14
<211> LENGTH: 26
<212> TYPE: DNA
<213> ORGANISM: Artificial
<220> FEATURE:
<223> OTHER INFORMATION: Synthesized DNA probe

<400> SEQUENCE: 14
taagtaacta tgcacgtctt gacggt                                              26
```

```
<210> SEQ ID NO 15
<211> LENGTH: 29
<212> TYPE: DNA
<213> ORGANISM: Artificial
<220> FEATURE:
<223> OTHER INFORMATION: Synthesized DNA probe

<400> SEQUENCE: 15
agaacaaatg tgtaagtaac tatgcacgt                                  29

<210> SEQ ID NO 16
<211> LENGTH: 26
<212> TYPE: DNA
<213> ORGANISM: Artificial
<220> FEATURE:
<223> OTHER INFORMATION: Synthesized DNA probe

<400> SEQUENCE: 16
gacccctcta gagatagagt tttccc                                     26

<210> SEQ ID NO 17
<211> LENGTH: 24
<212> TYPE: DNA
<213> ORGANISM: Artificial
<220> FEATURE:
<223> OTHER INFORMATION: Synthesized DNA probe

<400> SEQUENCE: 17
agtaaccatt tggagctagc cgtc                                       24

<210> SEQ ID NO 18
<211> LENGTH: 22
<212> TYPE: DNA
<213> ORGANISM: Artificial
<220> FEATURE:
<223> OTHER INFORMATION: Synthesized DNA probe

<400> SEQUENCE: 18
accatttgga gctagccgtc ga                                         22

<210> SEQ ID NO 19
<211> LENGTH: 28
<212> TYPE: DNA
<213> ORGANISM: Artificial
<220> FEATURE:
<223> OTHER INFORMATION: Synthesized DNA probe

<400> SEQUENCE: 19
taacaggaag aagcttgctt ctttgctg                                   28

<210> SEQ ID NO 20
<211> LENGTH: 22
<212> TYPE: DNA
<213> ORGANISM: Artificial
<220> FEATURE:
<223> OTHER INFORMATION: Synthesized DNA probe

<400> SEQUENCE: 20
ctcttgccat cggatgtgcc ca                                         22

<210> SEQ ID NO 21
<211> LENGTH: 26
<212> TYPE: DNA
<213> ORGANISM: Artificial
<220> FEATURE:
<223> OTHER INFORMATION: Synthesized DNA probe
```

<400> SEQUENCE: 21 ataccttttgc tcattgacgt tacccg                               26

<210> SEQ ID NO 22
<211> LENGTH: 24
<212> TYPE: DNA
<213> ORGANISM: Artificial
<220> FEATURE:
<223> OTHER INFORMATION: Synthesized DNA probe

<400> SEQUENCE: 22
tttgctcatt gacgttaccc gcag                                  24

<210> SEQ ID NO 23
<211> LENGTH: 25
<212> TYPE: DNA
<213> ORGANISM: Artificial
<220> FEATURE:
<223> OTHER INFORMATION: Synthesized DNA probe

<400> SEQUENCE: 23
actggcaagc ttgagtctcg tagag                                 25

<210> SEQ ID NO 24
<211> LENGTH: 25
<212> TYPE: DNA
<213> ORGANISM: Artificial
<220> FEATURE:
<223> OTHER INFORMATION: Synthesized DNA probe

<400> SEQUENCE: 24
cggacctcat aaagtgcgtc gtagt                                 25

<210> SEQ ID NO 25
<211> LENGTH: 24
<212> TYPE: DNA
<213> ORGANISM: Artificial
<220> FEATURE:
<223> OTHER INFORMATION: Synthesized DNA probe

<400> SEQUENCE: 25
tcatgccatc agatgtgccc agat                                  24

<210> SEQ ID NO 26
<211> LENGTH: 25
<212> TYPE: DNA
<213> ORGANISM: Artificial
<220> FEATURE:
<223> OTHER INFORMATION: Synthesized DNA probe

<400> SEQUENCE: 26
ttcgattgac gttacccgca gaaga                                 25

<210> SEQ ID NO 27
<211> LENGTH: 26
<212> TYPE: DNA
<213> ORGANISM: Artificial
<220> FEATURE:
<223> OTHER INFORMATION: Synthesized DNA probe

<400> SEQUENCE: 27
ggtctgtcaa gtcggatgtg aaatcc                                26

<210> SEQ ID NO 28

```
<211> LENGTH: 25
<212> TYPE: DNA
<213> ORGANISM: Artificial
<220> FEATURE:
<223> OTHER INFORMATION: Synthesized DNA probe

<400> SEQUENCE: 28
cattcgaaac tggcaggcta gagtc                                              25

<210> SEQ ID NO 29
<211> LENGTH: 24
<212> TYPE: DNA
<213> ORGANISM: Artificial
<220> FEATURE:
<223> OTHER INFORMATION: Synthesized DNA probe

<400> SEQUENCE: 29
gcaggctaga gtcttgtaga gggg                                               24

<210> SEQ ID NO 30
<211> LENGTH: 22
<212> TYPE: DNA
<213> ORGANISM: Artificial
<220> FEATURE:
<223> OTHER INFORMATION: Synthesized DNA probe

<400> SEQUENCE: 30
cctttgttgc cagcggttag gc                                                 22

<210> SEQ ID NO 31
<211> LENGTH: 24
<212> TYPE: DNA
<213> ORGANISM: Artificial
<220> FEATURE:
<223> OTHER INFORMATION: Synthesized DNA probe

<400> SEQUENCE: 31
tgagggagaa agtgggggat cttc                                               24

<210> SEQ ID NO 32
<211> LENGTH: 28
<212> TYPE: DNA
<213> ORGANISM: Artificial
<220> FEATURE:
<223> OTHER INFORMATION: Synthesized DNA probe

<400> SEQUENCE: 32
tgcatccaaa actactgagc tagagtac                                           28

<210> SEQ ID NO 33
<211> LENGTH: 24
<212> TYPE: DNA
<213> ORGANISM: Artificial
<220> FEATURE:
<223> OTHER INFORMATION: Synthesized DNA probe

<400> SEQUENCE: 33
gaccacctgg actgatactg acac                                               24

<210> SEQ ID NO 34
<211> LENGTH: 22
<212> TYPE: DNA
<213> ORGANISM: Artificial
<220> FEATURE:
<223> OTHER INFORMATION: Synthesized DNA probe

<400> SEQUENCE: 34
```

-continued gtcgactagc cgttgggatc ct                                              22

<210> SEQ ID NO 35
<211> LENGTH: 25
<212> TYPE: DNA
<213> ORGANISM: Artificial
<220> FEATURE:
<223> OTHER INFORMATION: Synthesized DNA probe

<400> SEQUENCE: 35
tggccttgac atgctgagaa ctttc                                           25

<210> SEQ ID NO 36
<211> LENGTH: 23
<212> TYPE: DNA
<213> ORGANISM: Artificial
<220> FEATURE:
<223> OTHER INFORMATION: Synthesized DNA probe

<400> SEQUENCE: 36
ttagttacca gcacctcggg tgg                                             23

<210> SEQ ID NO 37
<211> LENGTH: 22
<212> TYPE: DNA
<213> ORGANISM: Artificial
<220> FEATURE:
<223> OTHER INFORMATION: Synthesized DNA probe

<400> SEQUENCE: 37
ggtagcacag gggagcttgc tc                                              22

<210> SEQ ID NO 38
<211> LENGTH: 26
<212> TYPE: DNA
<213> ORGANISM: Artificial
<220> FEATURE:
<223> OTHER INFORMATION: Synthesized DNA probe

<400> SEQUENCE: 38
cgaggaggaa ggtggtgagc ttaata                                          26

<210> SEQ ID NO 39
<211> LENGTH: 26
<212> TYPE: DNA
<213> ORGANISM: Artificial
<220> FEATURE:
<223> OTHER INFORMATION: Synthesized DNA probe

<400> SEQUENCE: 39
tacgctcatc aattgacgtt actcgc                                          26

<210> SEQ ID NO 40
<211> LENGTH: 26
<212> TYPE: DNA
<213> ORGANISM: Artificial
<220> FEATURE:
<223> OTHER INFORMATION: Synthesized DNA probe

<400> SEQUENCE: 40
tcatcaattg acgttactcg cagaag                                          26

<210> SEQ ID NO 41
<211> LENGTH: 27
<212> TYPE: DNA

```
<213> ORGANISM: Artificial
<220> FEATURE:
<223> OTHER INFORMATION: Synthesized DNA probe

<400> SEQUENCE: 41
gaaactggca agctagagtc tcgtaga                                               27

<210> SEQ ID NO 42
<211> LENGTH: 26
<212> TYPE: DNA
<213> ORGANISM: Artificial
<220> FEATURE:
<223> OTHER INFORMATION: Synthesized DNA probe

<400> SEQUENCE: 42
actgcatttg aaactggcaa gctaga                                                26

<210> SEQ ID NO 43
<211> LENGTH: 25
<212> TYPE: DNA
<213> ORGANISM: Artificial
<220> FEATURE:
<223> OTHER INFORMATION: Synthesized DNA probe

<400> SEQUENCE: 43
agtagaacgc tgaaggagga gcttg                                                 25

<210> SEQ ID NO 44
<211> LENGTH: 27
<212> TYPE: DNA
<213> ORGANISM: Artificial
<220> FEATURE:
<223> OTHER INFORMATION: Synthesized DNA probe

<400> SEQUENCE: 44
gacatttgct taaaggtgc acttgca                                                27

<210> SEQ ID NO 45
<211> LENGTH: 29
<212> TYPE: DNA
<213> ORGANISM: Artificial
<220> FEATURE:
<223> OTHER INFORMATION: Synthesized DNA probe

<400> SEQUENCE: 45
gttgtaagag aagaacgagt gtgagagtg                                             29

<210> SEQ ID NO 46
<211> LENGTH: 23
<212> TYPE: DNA
<213> ORGANISM: Artificial
<220> FEATURE:
<223> OTHER INFORMATION: Synthesized DNA probe

<400> SEQUENCE: 46
aagcggctct ctggcttgta act                                                   23

<210> SEQ ID NO 47
<211> LENGTH: 24
<212> TYPE: DNA
<213> ORGANISM: Artificial
<220> FEATURE:
<223> OTHER INFORMATION: Synthesized DNA probe

<400> SEQUENCE: 47
tagacccttt ccggggttta gtgc                                                  24
```

```
<210> SEQ ID NO 48
<211> LENGTH: 26
<212> TYPE: DNA
<213> ORGANISM: Artificial
<220> FEATURE:
<223> OTHER INFORMATION: Synthesized DNA probe

<400> SEQUENCE: 48
gacggcaagc taatctctta aagcca                                          26

<210> SEQ ID NO 49
<211> LENGTH: 24
<212> TYPE: DNA
<213> ORGANISM: Artificial
<220> FEATURE:
<223> OTHER INFORMATION: Synthesized DNA probe

<400> SEQUENCE: 49
gcttgggaat ctggcttatg gagg                                            24

<210> SEQ ID NO 50
<211> LENGTH: 23
<212> TYPE: DNA
<213> ORGANISM: Artificial
<220> FEATURE:
<223> OTHER INFORMATION: Synthesized DNA probe

<400> SEQUENCE: 50
tgccatagga tgagcccaag tgg                                             23

<210> SEQ ID NO 51
<211> LENGTH: 23
<212> TYPE: DNA
<213> ORGANISM: Artificial
<220> FEATURE:
<223> OTHER INFORMATION: Synthesized DNA probe

<400> SEQUENCE: 51
aatgcctacc aagcctgcga tct                                             23

<210> SEQ ID NO 52
<211> LENGTH: 26
<212> TYPE: DNA
<213> ORGANISM: Artificial
<220> FEATURE:
<223> OTHER INFORMATION: Synthesized DNA probe

<400> SEQUENCE: 52
cttgggaatg tactgacgct catgtg                                          26

<210> SEQ ID NO 53
<211> LENGTH: 22
<212> TYPE: DNA
<213> ORGANISM: Artificial
<220> FEATURE:
<223> OTHER INFORMATION: Synthesized DNA probe

<400> SEQUENCE: 53
tacagaggga agcgaagctg cg                                              22

<210> SEQ ID NO 54
<211> LENGTH: 26
<212> TYPE: DNA
<213> ORGANISM: Artificial
<220> FEATURE:
```

<223> OTHER INFORMATION: Synthesized DNA probe

<400> SEQUENCE: 54
ggcgtttacc acgtatgat tcatga						26

<210> SEQ ID NO 55
<211> LENGTH: 23
<212> TYPE: DNA
<213> ORGANISM: Artificial
<220> FEATURE:
<223> OTHER INFORMATION: Synthesized DNA probe

<400> SEQUENCE: 55
ttctttcctc ccgagtgctt gca						23

<210> SEQ ID NO 56
<211> LENGTH: 24
<212> TYPE: DNA
<213> ORGANISM: Artificial
<220> FEATURE:
<223> OTHER INFORMATION: Synthesized DNA probe

<400> SEQUENCE: 56
atggcataag agtgaaaggc gctt						24

<210> SEQ ID NO 57
<211> LENGTH: 25
<212> TYPE: DNA
<213> ORGANISM: Artificial
<220> FEATURE:
<223> OTHER INFORMATION: Synthesized DNA probe

<400> SEQUENCE: 57
ggacgttagt aactgaacgt cccct						25

<210> SEQ ID NO 58
<211> LENGTH: 22
<212> TYPE: DNA
<213> ORGANISM: Artificial
<220> FEATURE:
<223> OTHER INFORMATION: Synthesized DNA probe

<400> SEQUENCE: 58
ctcaaccggg gagggtcatt gg						22

<210> SEQ ID NO 59
<211> LENGTH: 25
<212> TYPE: DNA
<213> ORGANISM: Artificial
<220> FEATURE:
<223> OTHER INFORMATION: Synthesized DNA probe

<400> SEQUENCE: 59
atagagcttt cccttcgggg acaaa						25

<210> SEQ ID NO 60
<211> LENGTH: 29
<212> TYPE: DNA
<213> ORGANISM: Artificial
<220> FEATURE:
<223> OTHER INFORMATION: Synthesized DNA probe

<400> SEQUENCE: 60
cgaggtcatg caaatctctt aaagcttct						29

```
<210> SEQ ID NO 61
<211> LENGTH: 23
<212> TYPE: DNA
<213> ORGANISM: Artificial
<220> FEATURE:
<223> OTHER INFORMATION: Synthesized DNA primer

<400> SEQUENCE: 61
gcggcgtgcc taatacatgc aag                                          23

<210> SEQ ID NO 62
<211> LENGTH: 23
<212> TYPE: DNA
<213> ORGANISM: Artificial
<220> FEATURE:
<223> OTHER INFORMATION: Synthesized DNA primer

<400> SEQUENCE: 62
gcggcaggcc taacacatgc aag                                          23

<210> SEQ ID NO 63
<211> LENGTH: 23
<212> TYPE: DNA
<213> ORGANISM: Artificial
<220> FEATURE:
<223> OTHER INFORMATION: Synthesized DNA primer

<400> SEQUENCE: 63
gcggcaggct taacacatgc aag                                          23

<210> SEQ ID NO 64
<211> LENGTH: 22
<212> TYPE: DNA
<213> ORGANISM: Artificial
<220> FEATURE:
<223> OTHER INFORMATION: Synthesized DNA primer

<400> SEQUENCE: 64
atccagccgc accttccgat ac                                           22

<210> SEQ ID NO 65
<211> LENGTH: 22
<212> TYPE: DNA
<213> ORGANISM: Artificial
<220> FEATURE:
<223> OTHER INFORMATION: Synthesized DNA primer

<400> SEQUENCE: 65
atccaaccgc aggttcccct ac                                           22

<210> SEQ ID NO 66
<211> LENGTH: 22
<212> TYPE: DNA
<213> ORGANISM: Artificial
<220> FEATURE:
<223> OTHER INFORMATION: Synthesized DNA primer

<400> SEQUENCE: 66
atccagccgc aggttcccct ac                                           22
```